No. 657,042. Patented Aug. 28, 1900.
R. H. ST. JOHN.
TYPE BAR MACHINE.
(Application filed Aug. 14, 1899.)

(No Model.) 18 Sheets—Sheet 1.

ATTEST

INVENTOR.
ROSWELL H. ST JOHN.
BY W. T. Fisher
ATTY

No. 657,042. Patented Aug. 28, 1900.
R. H. ST. JOHN.
TYPE BAR MACHINE.
(Application filed Aug. 14, 1899.)

(No Model.) 18 Sheets—Sheet 2.

ATTEST
INVENTOR.
Roswell H. St John.
BY H. T. Fisher
ATTY

No. 657,042. Patented Aug. 28, 1900.
R. H. ST. JOHN.
TYPE BAR MACHINE.
(Application filed Aug. 14, 1899.)
(No Model.) 18 Sheets—Sheet 4.

ATTEST
INVENTOR
ROSWELL H. ST JOHN
BY
ATTY

No. 657,042.  
R. H. ST. JOHN.  
TYPE BAR MACHINE.  
(Application filed Aug. 14, 1899.)

(No Model.)  
18 Sheets—Sheet 8.

ATTEST  
JB Moser  
H. E. Mudra.

INVENTOR  
ROSWELL H. ST JOHN  
By H. J. Fisher ATTY

No. 657,042. Patented Aug. 28, 1900.
R. H. ST. JOHN.
TYPE BAR MACHINE.
(Application filed Aug. 14, 1899.)
(No Model.) 18 Sheets—Sheet 9.

No. 657,042. Patented Aug. 28, 1900.
R. H. ST. JOHN.
TYPE BAR MACHINE.
(Application filed Aug. 14, 1899.)

(No Model.) 18 Sheets—Sheet 10.

ATTEST
TB Moser
H. E. Mudra.

INVENTOR.
ROSWELL H. ST JOHN

By W F Fisher
ATTY

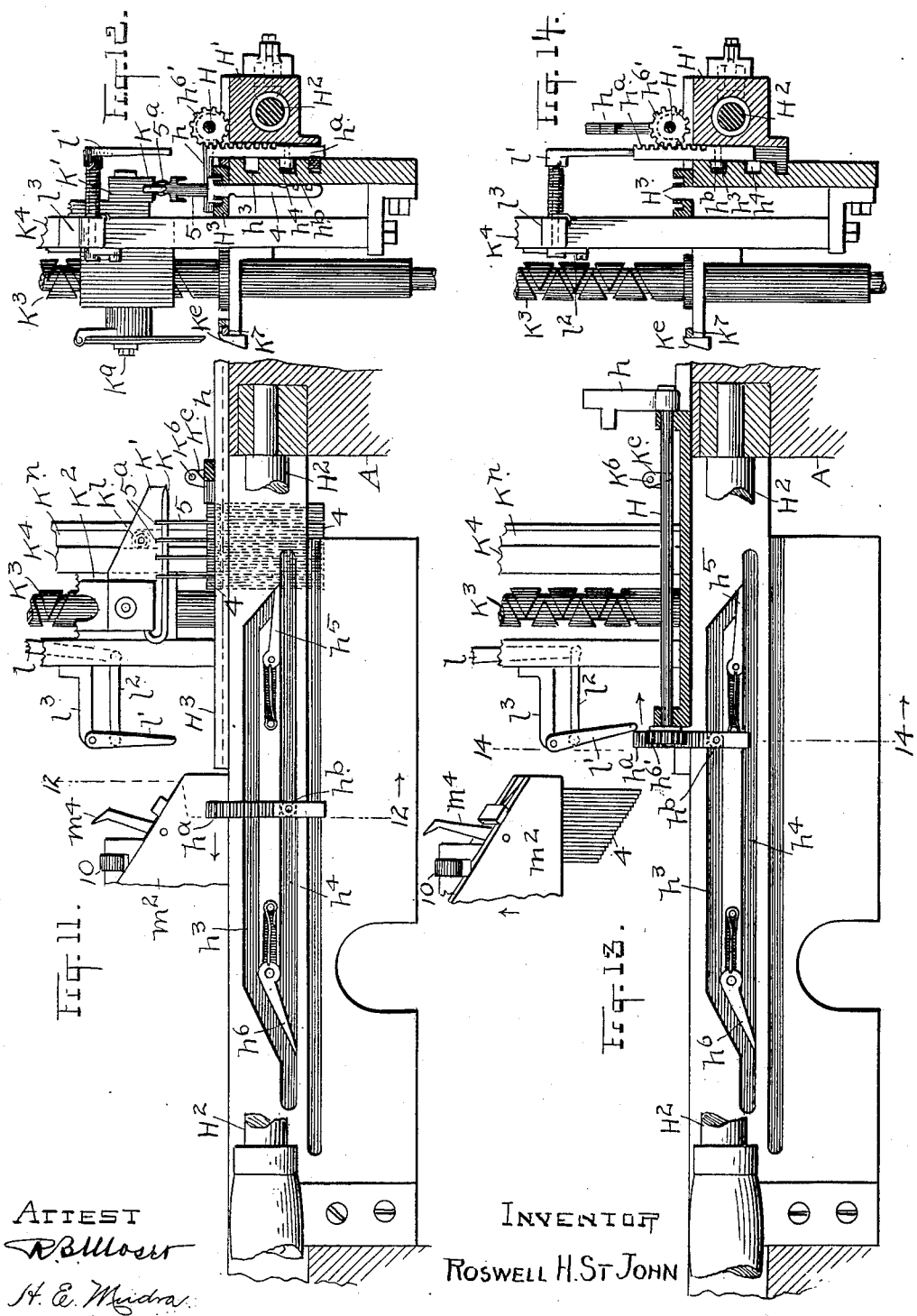

No. 657,042. Patented Aug. 28, 1900.
R. H. ST. JOHN.
TYPE BAR MACHINE.
(Application filed Aug. 14, 1899.)
(No Model.) 18 Sheets—Sheet 12.

ATTEST

INVENTOR
ROSWELL H. ST JOHN
BY H. J. Fisher ATTY

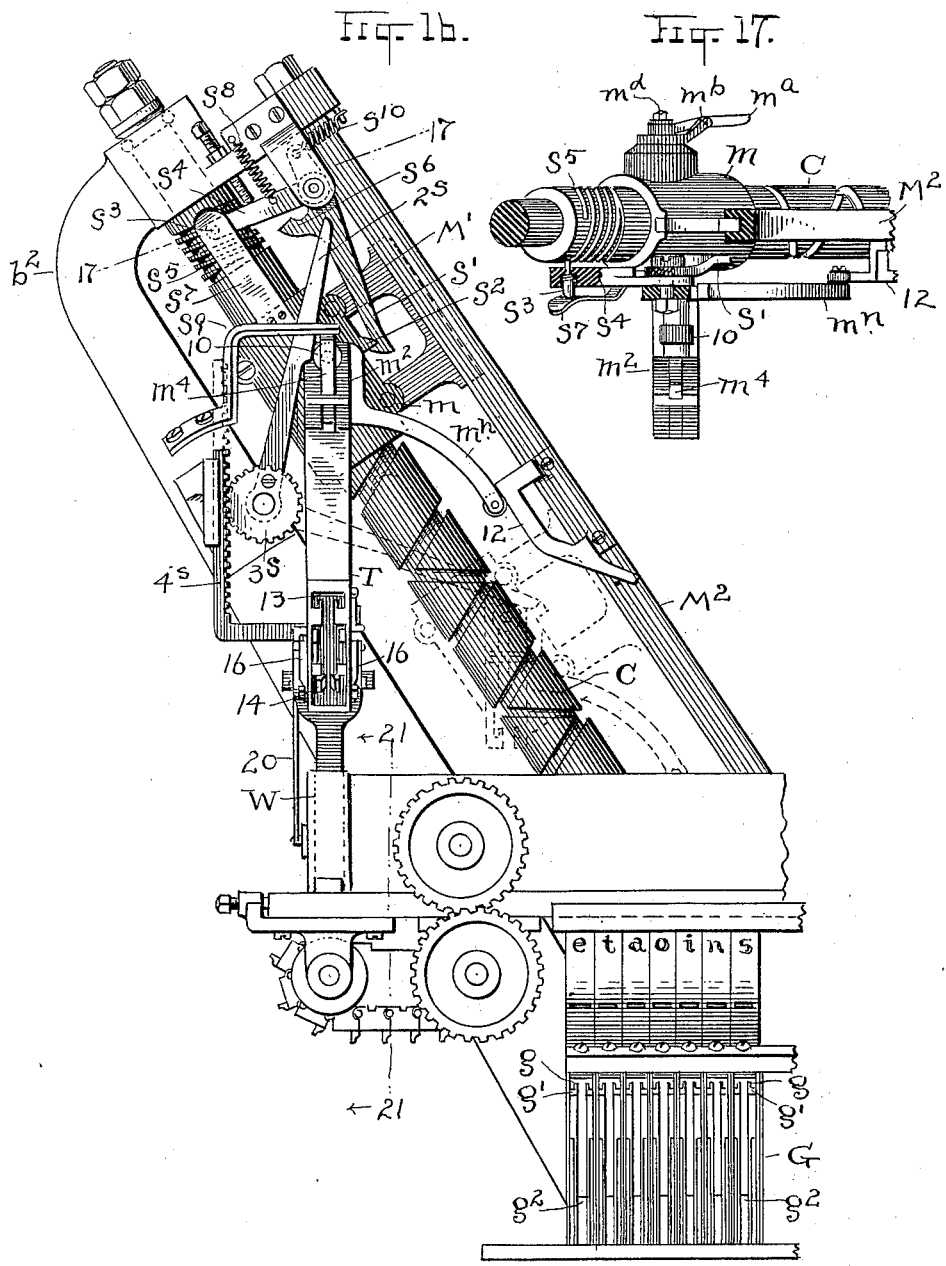

No. 657,042. Patented Aug. 28, 1900.
R. H. ST. JOHN.
TYPE BAR MACHINE.
(Application filed Aug. 14, 1899.)
(No Model.) 18 Sheets—Sheet 14.
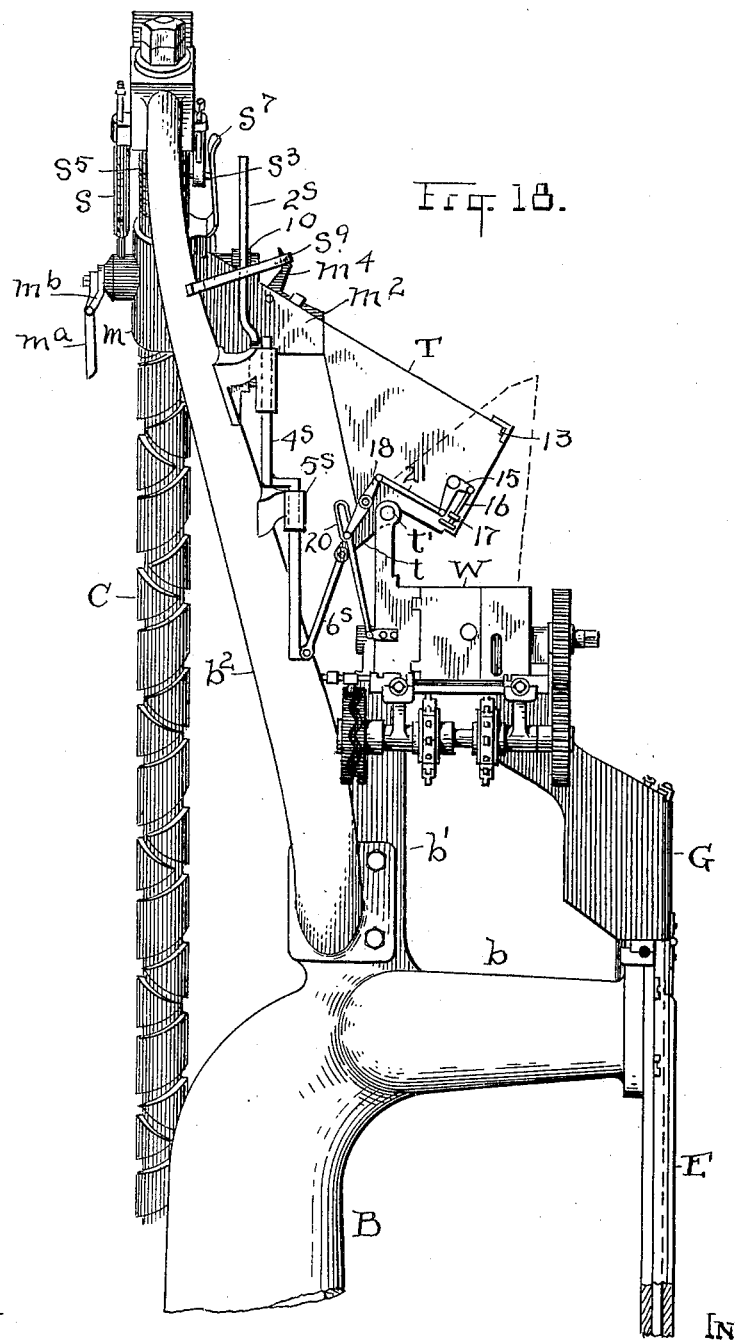

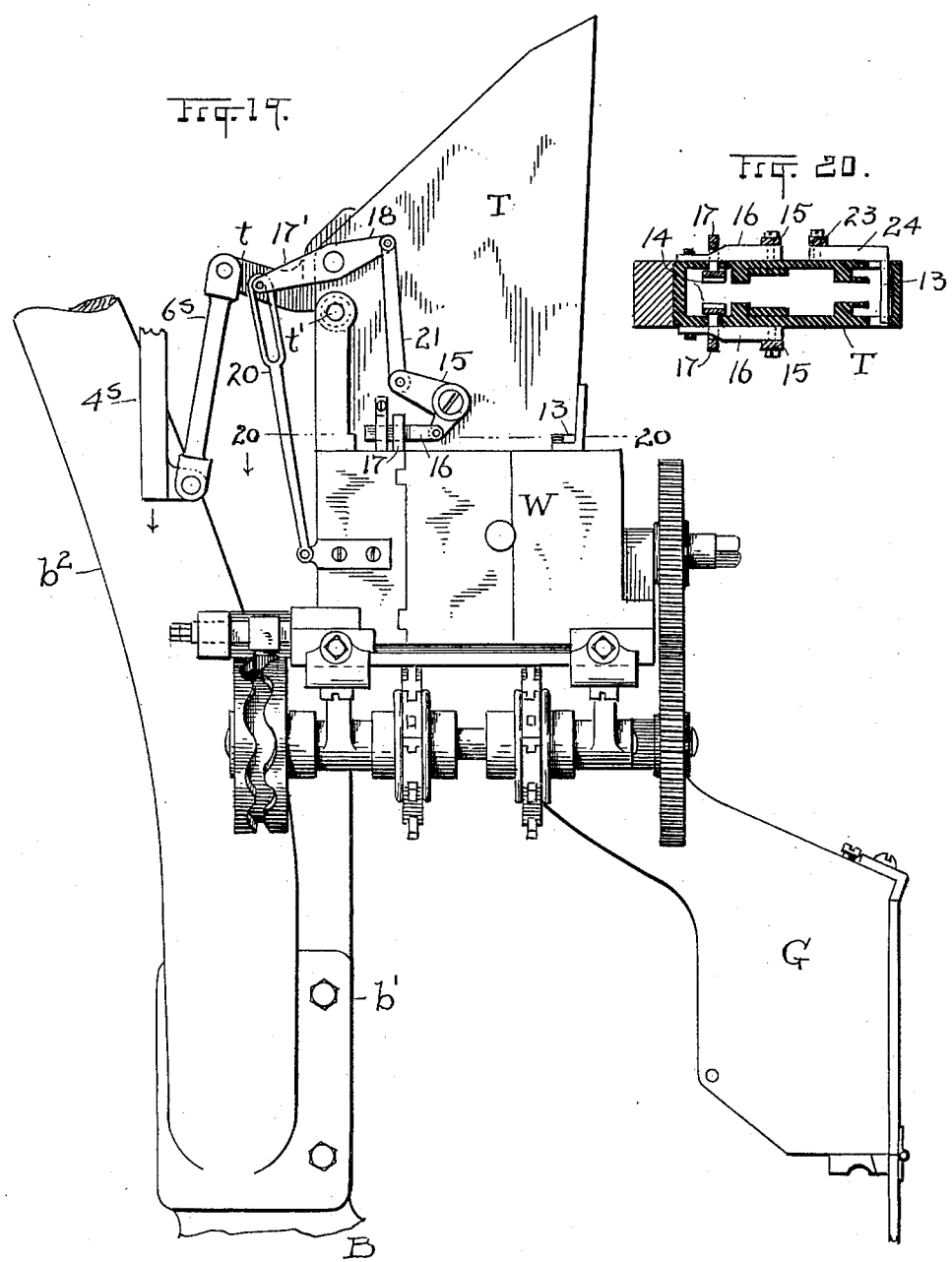

No. 657,042. Patented Aug. 28, 1900.
R. H. ST. JOHN.
TYPE BAR MACHINE.
(Application filed Aug. 14, 1899.)
(No Model.) 18 Sheets—Sheet 16.
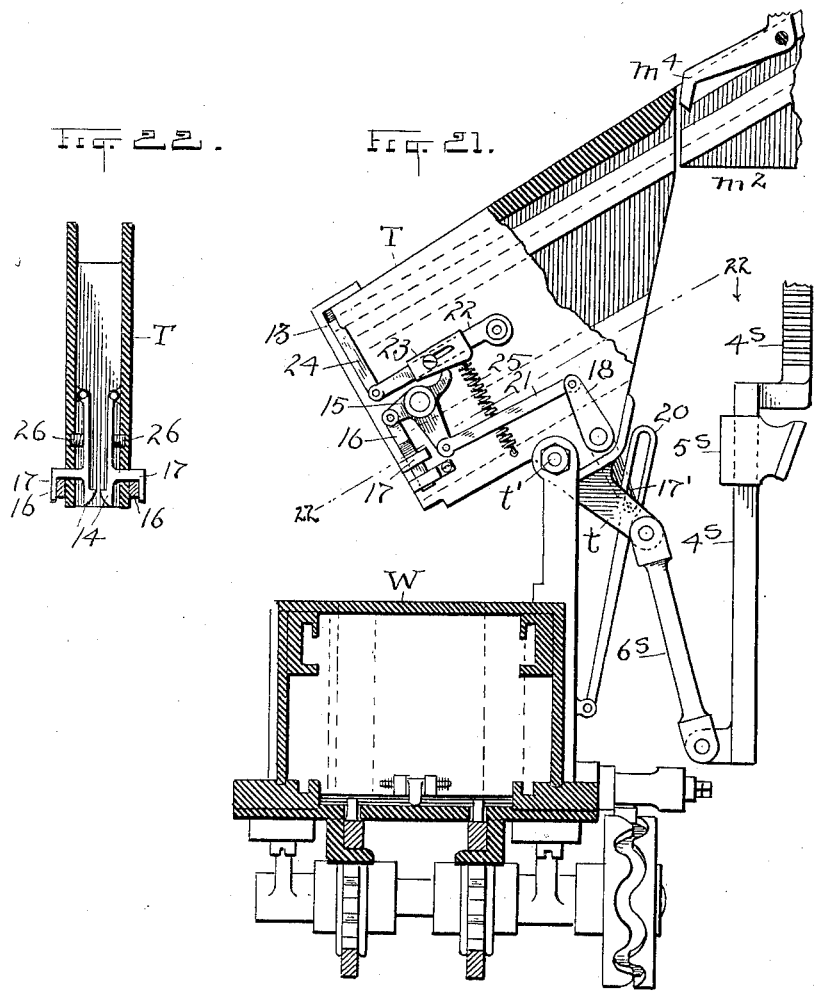
ATTEST
INVENTOR
ROSWELL H. ST JOHN
BY H. V. Fisher ATTY No. 657,042. Patented Aug. 28, 1900.
R. H. ST. JOHN.
TYPE BAR MACHINE.
(Application filed Aug. 14, 1899.)
(No Model.) 18 Sheets—Sheet 17.
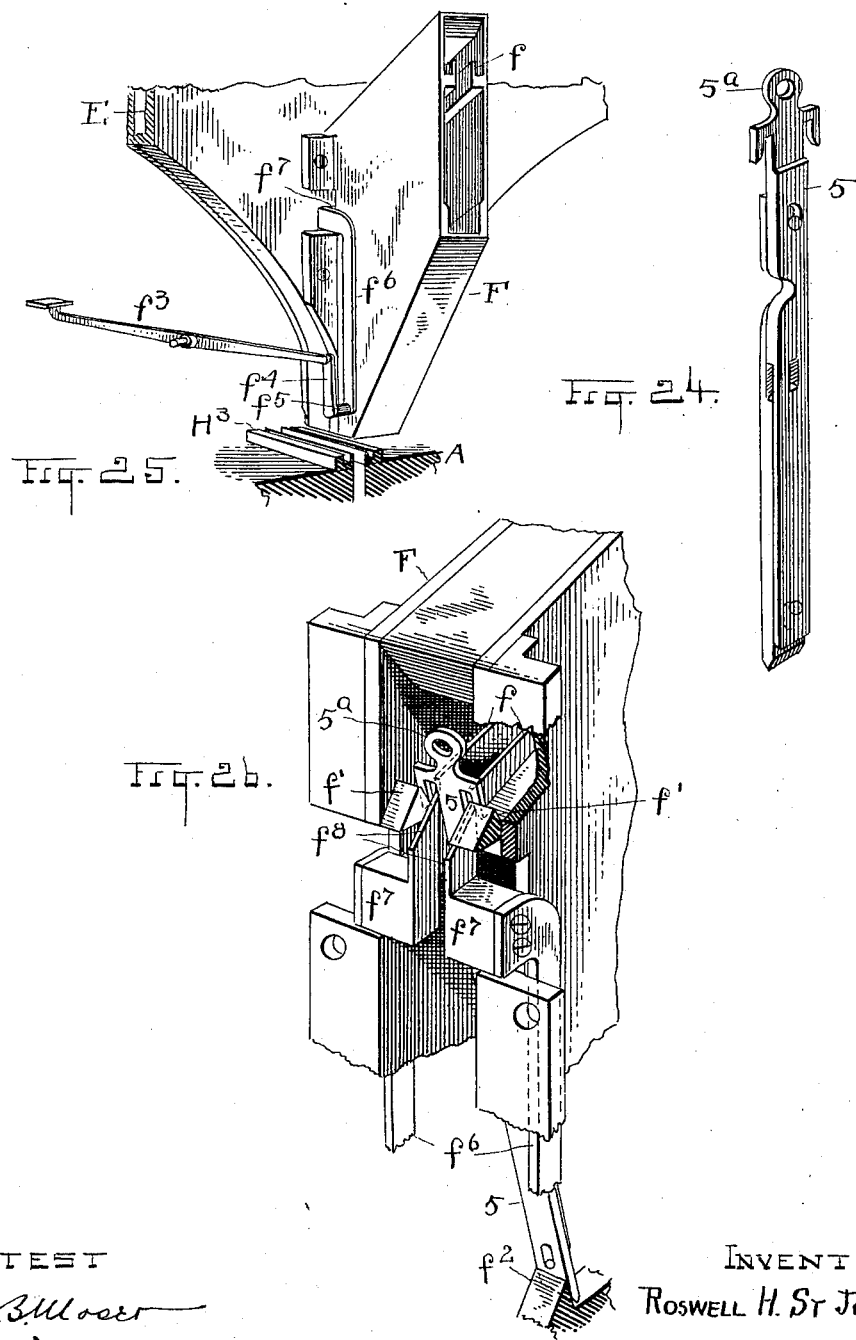

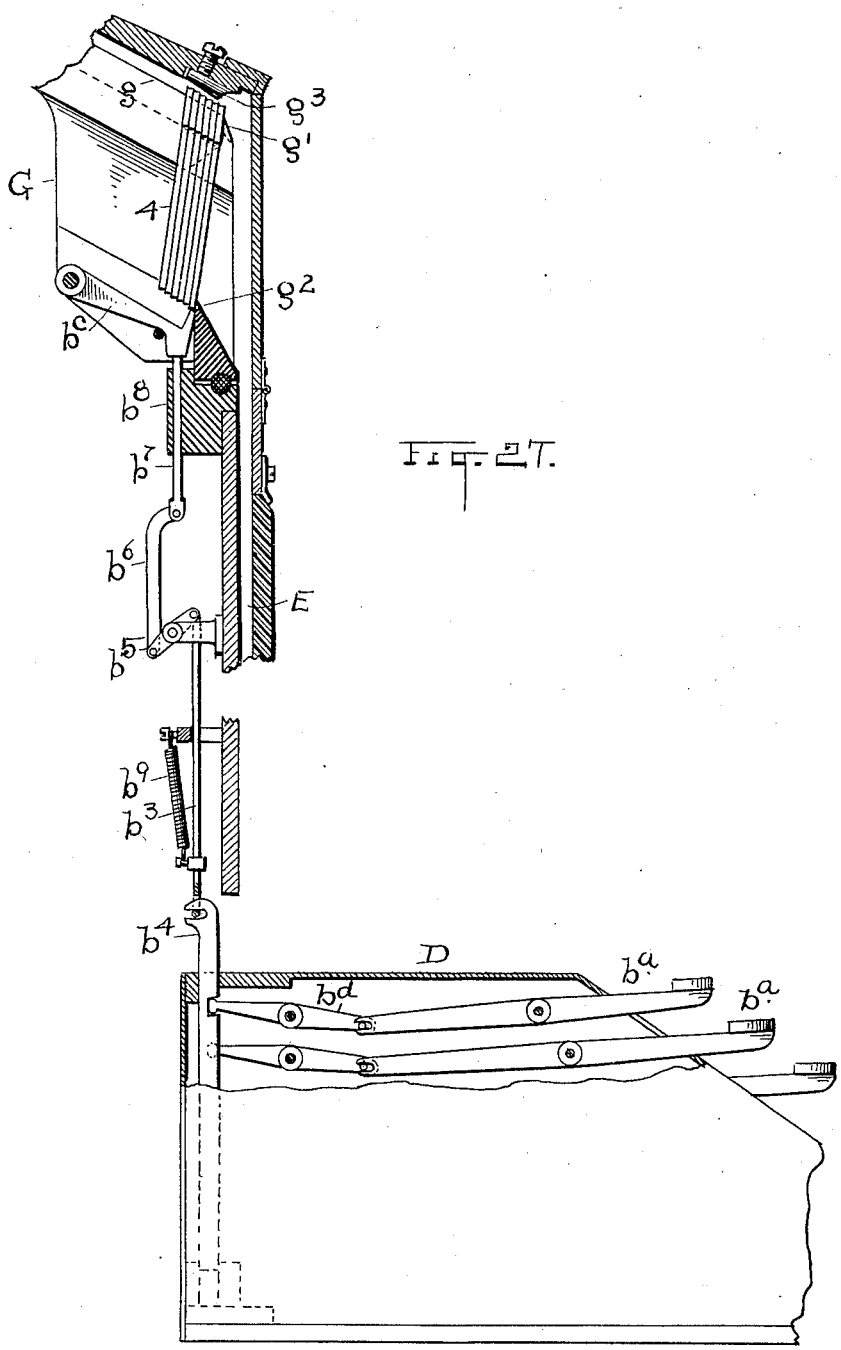

UNITED STATES PATENT OFFICE.

ROSWELL H. ST. JOHN, OF CLEVELAND, OHIO, ASSIGNOR TO JOSEPH J. LITTLE, EDWARD D. APPLETON, AND HOMER EATON, TRUSTEES, OF NEW YORK, N. Y.

TYPE-BAR MACHINE.

SPECIFICATION forming part of Letters Patent No. 657,042, dated August 28, 1900.

Application filed August 14, 1899. Serial No. 727,150. (No model.)

*To all whom it may concern:*

Be it known that I, ROSWELL H. ST. JOHN, a citizen of the United States, residing at Cleveland, in the county of Cuyahoga and State of Ohio, have invented certain new and useful Improvements in Type-Bar Machines; and I do declare that the following is a full, clear, and exact description of the invention, which will enable others skilled in the art to which it appertains to make and use the same.

My invention relates to type-bar machines; and the invention consists in the construction and combination of parts hereinafter shown and described, and particularly pointed out in the claims.

Figure 1:
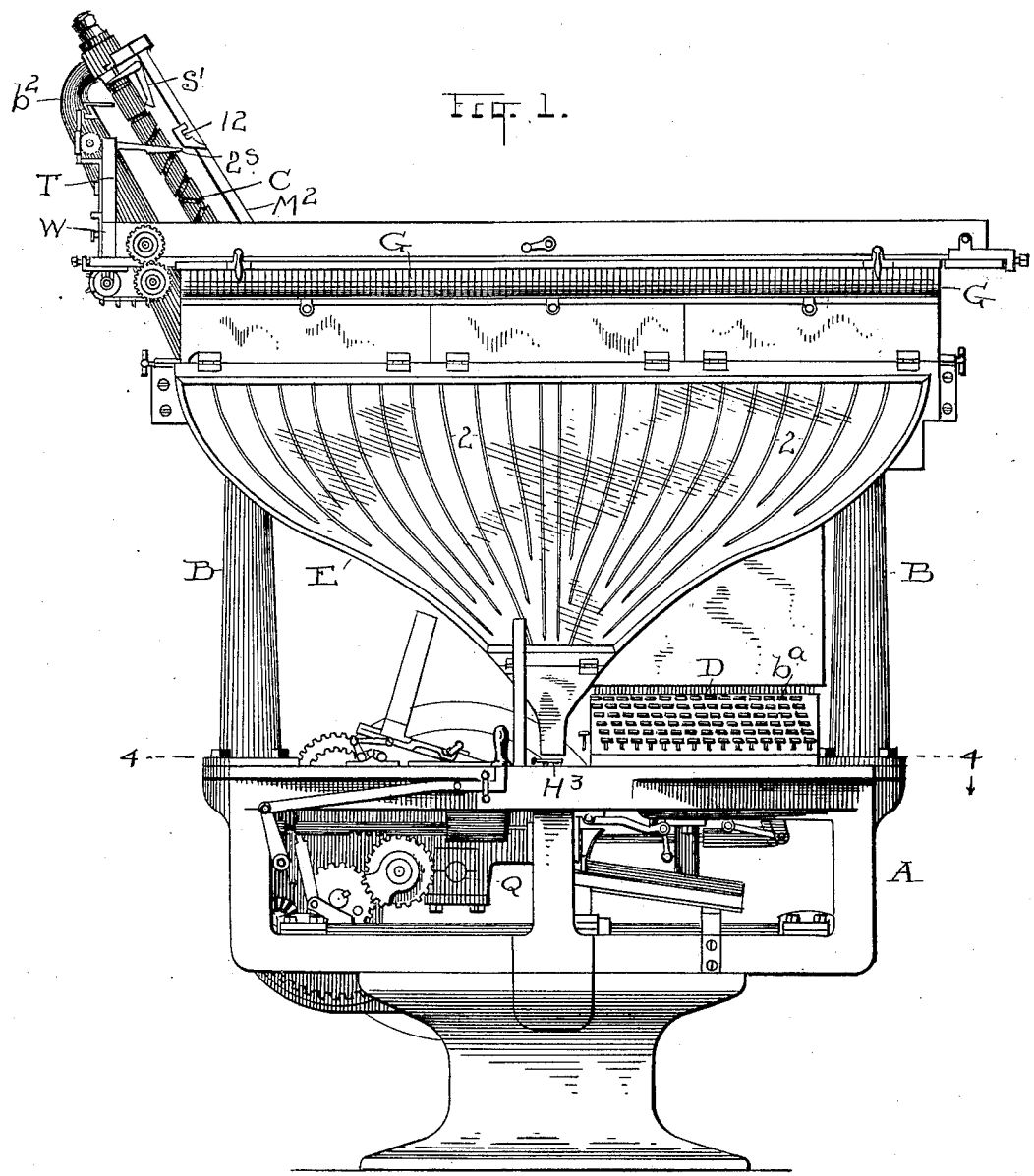
Figure 2:
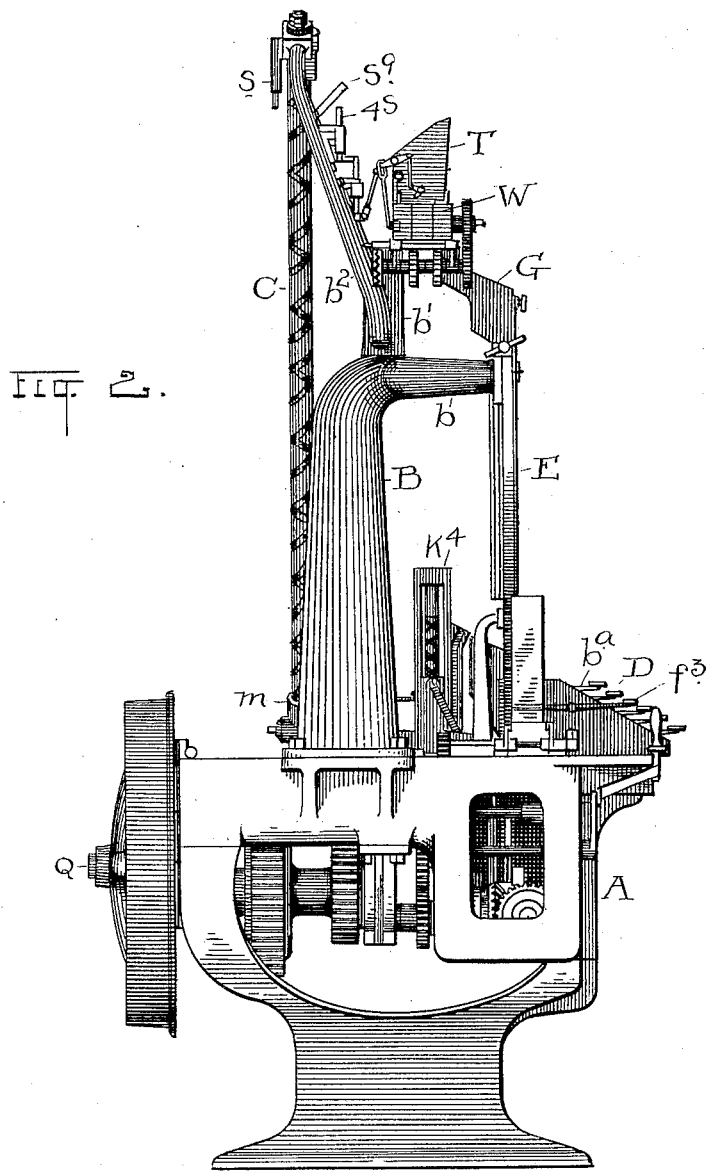
Figure 3:
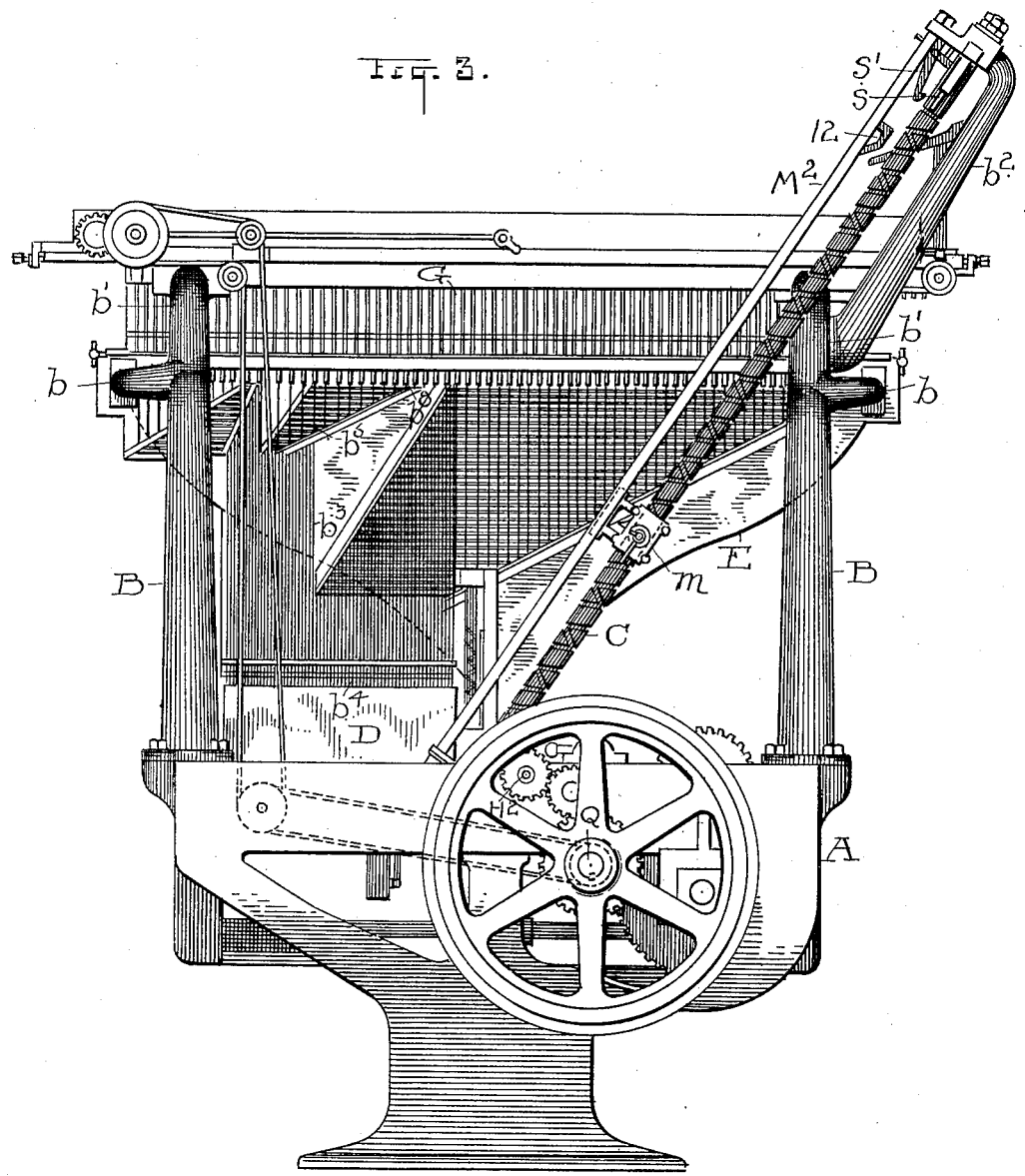
Figure 4:
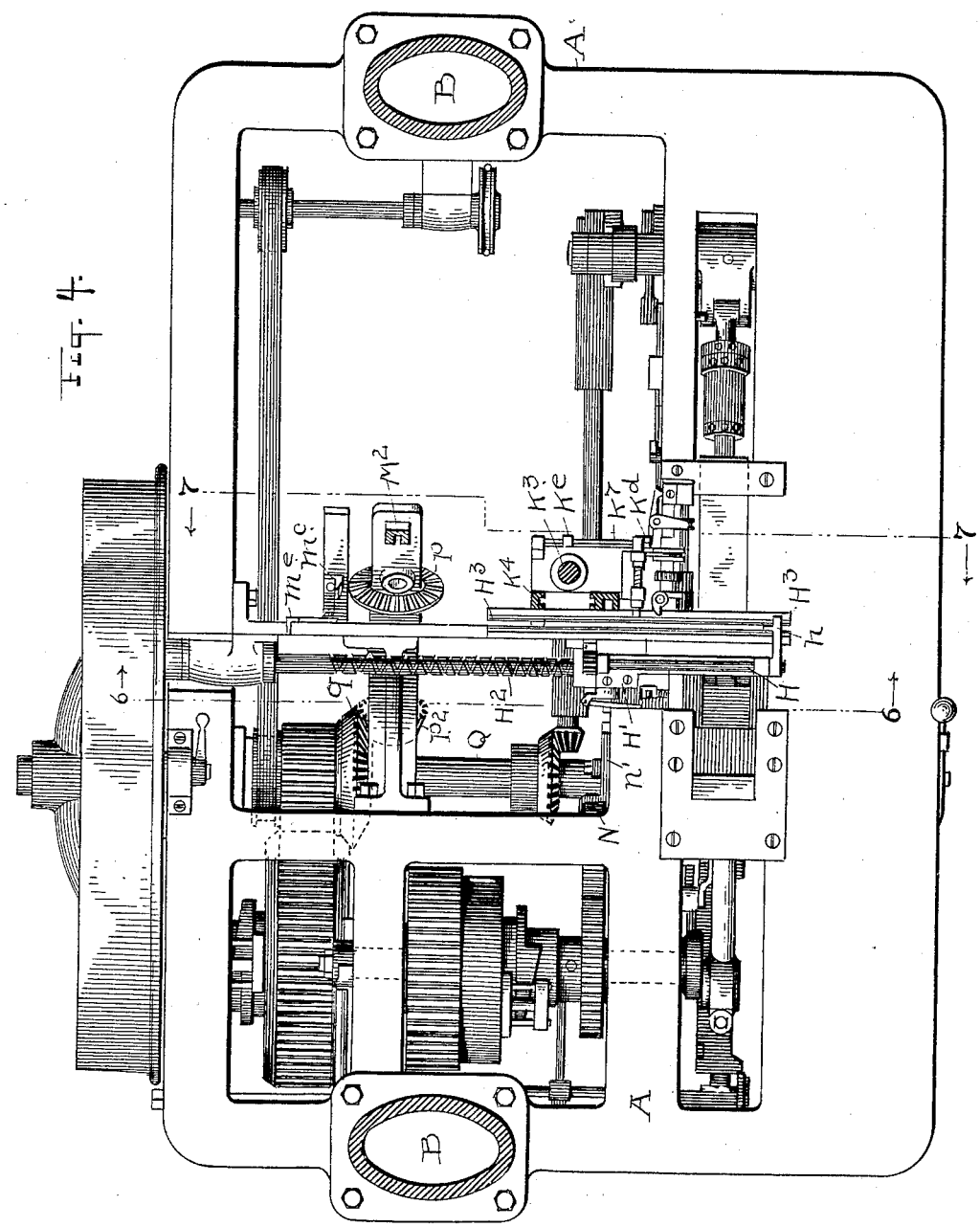
Figure 5:
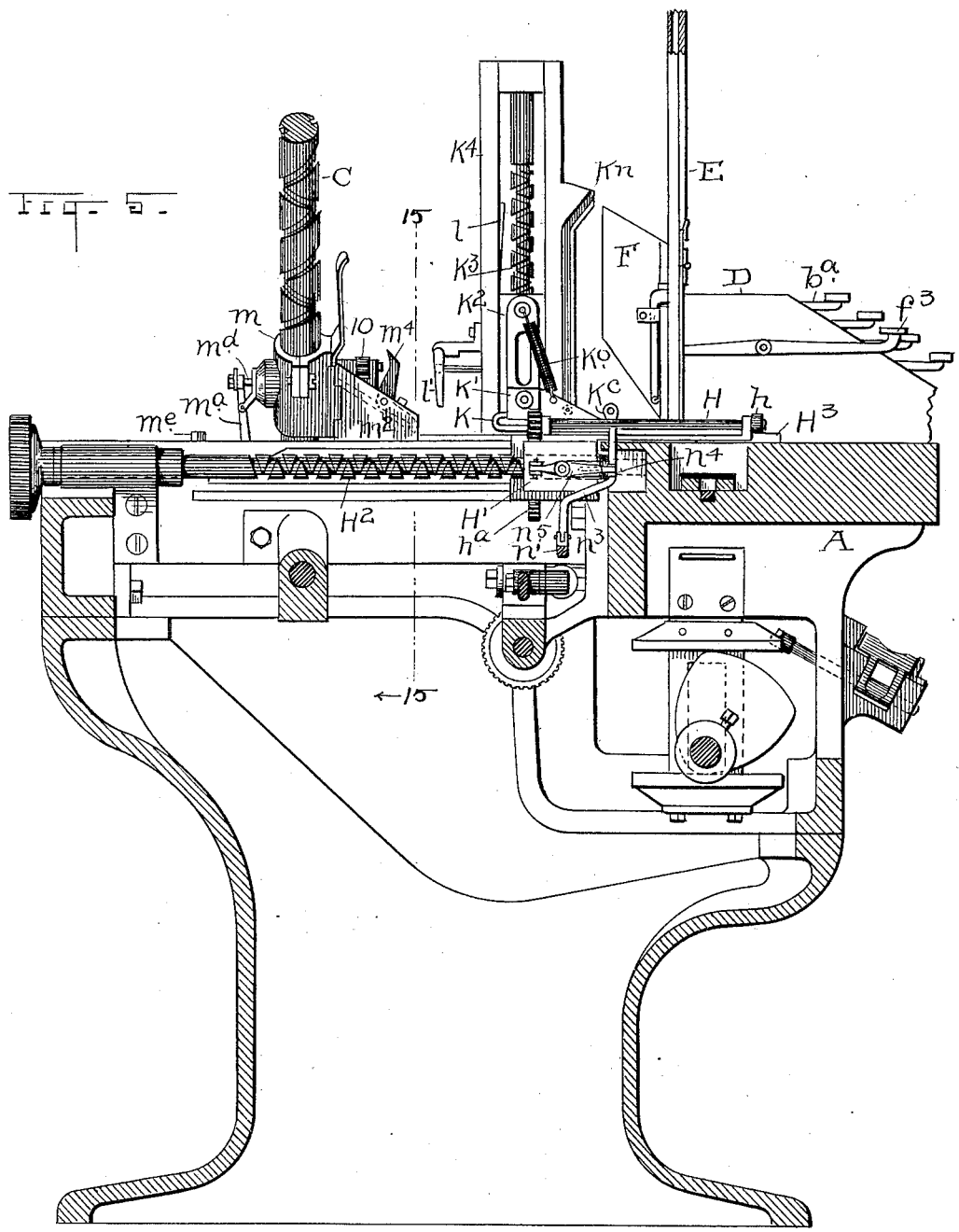
Figure 6:
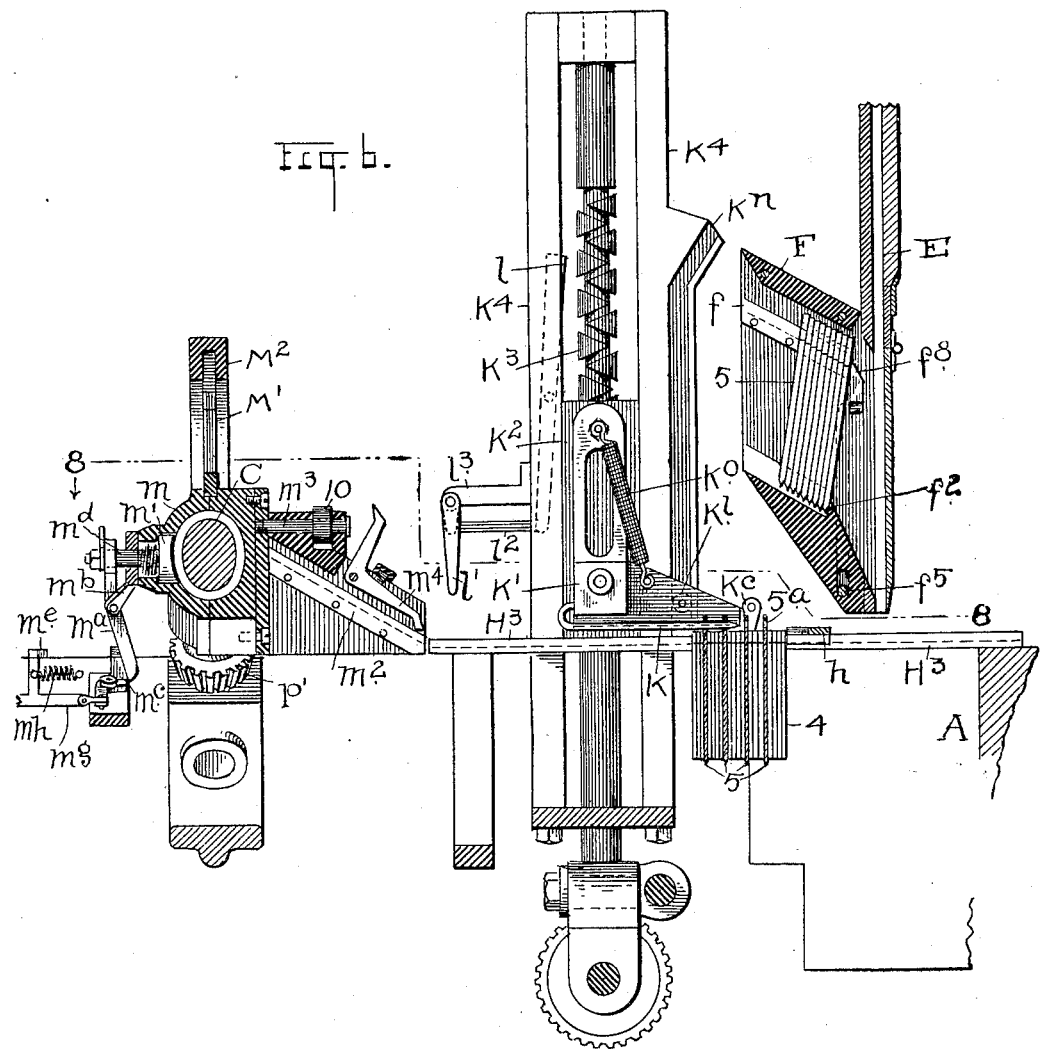
Figure 7:
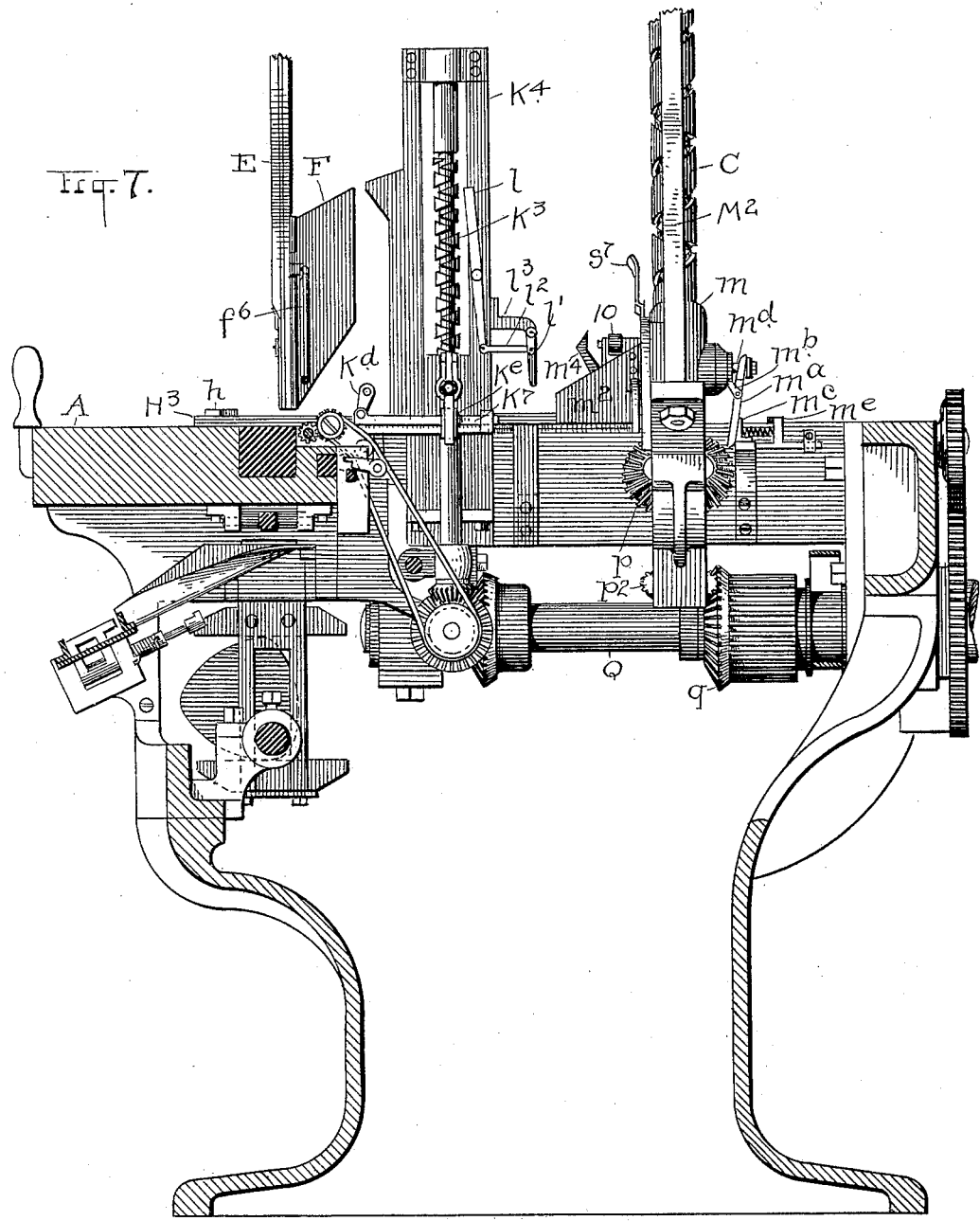
Figure 8:
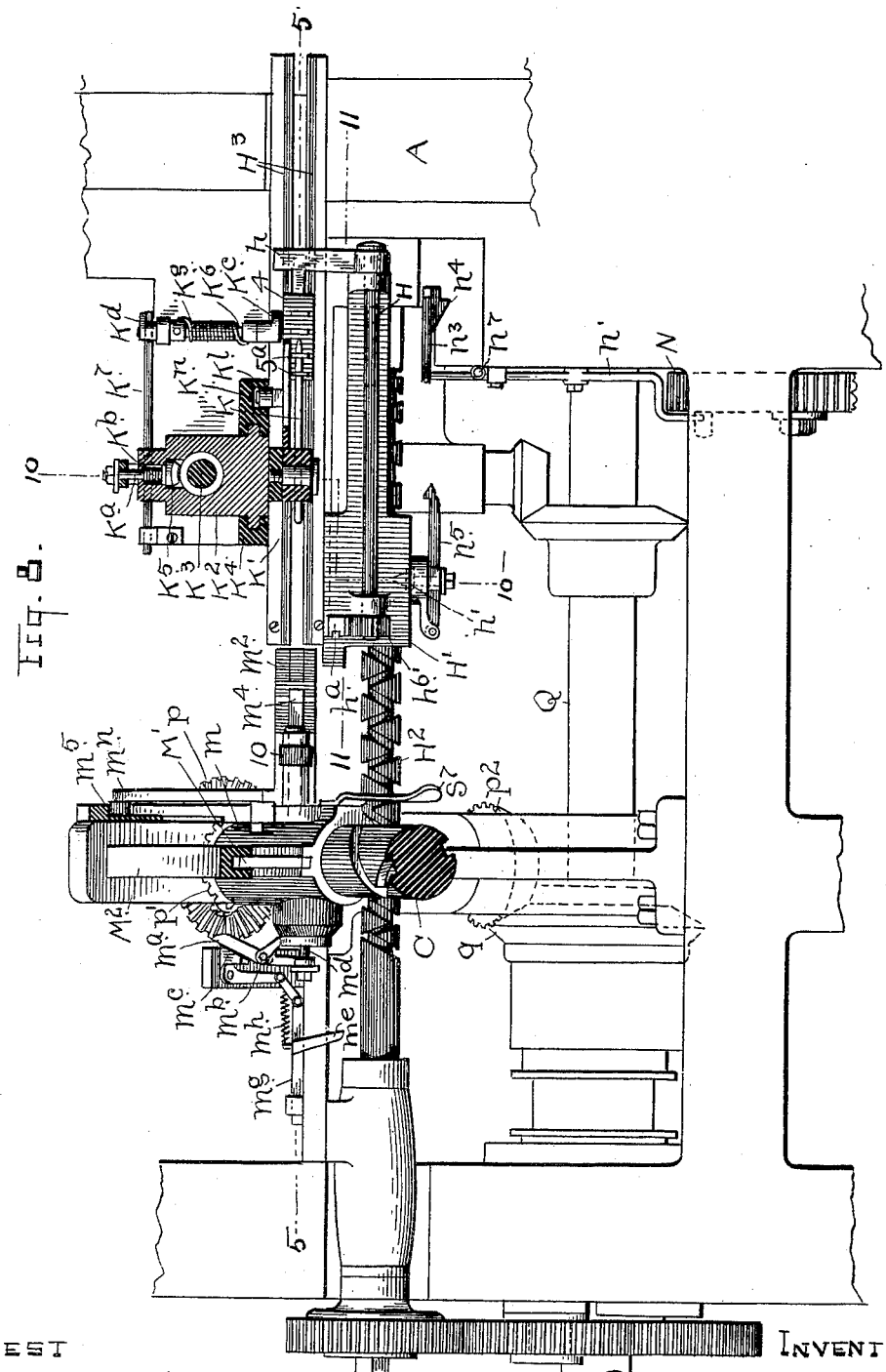
Figure 9:
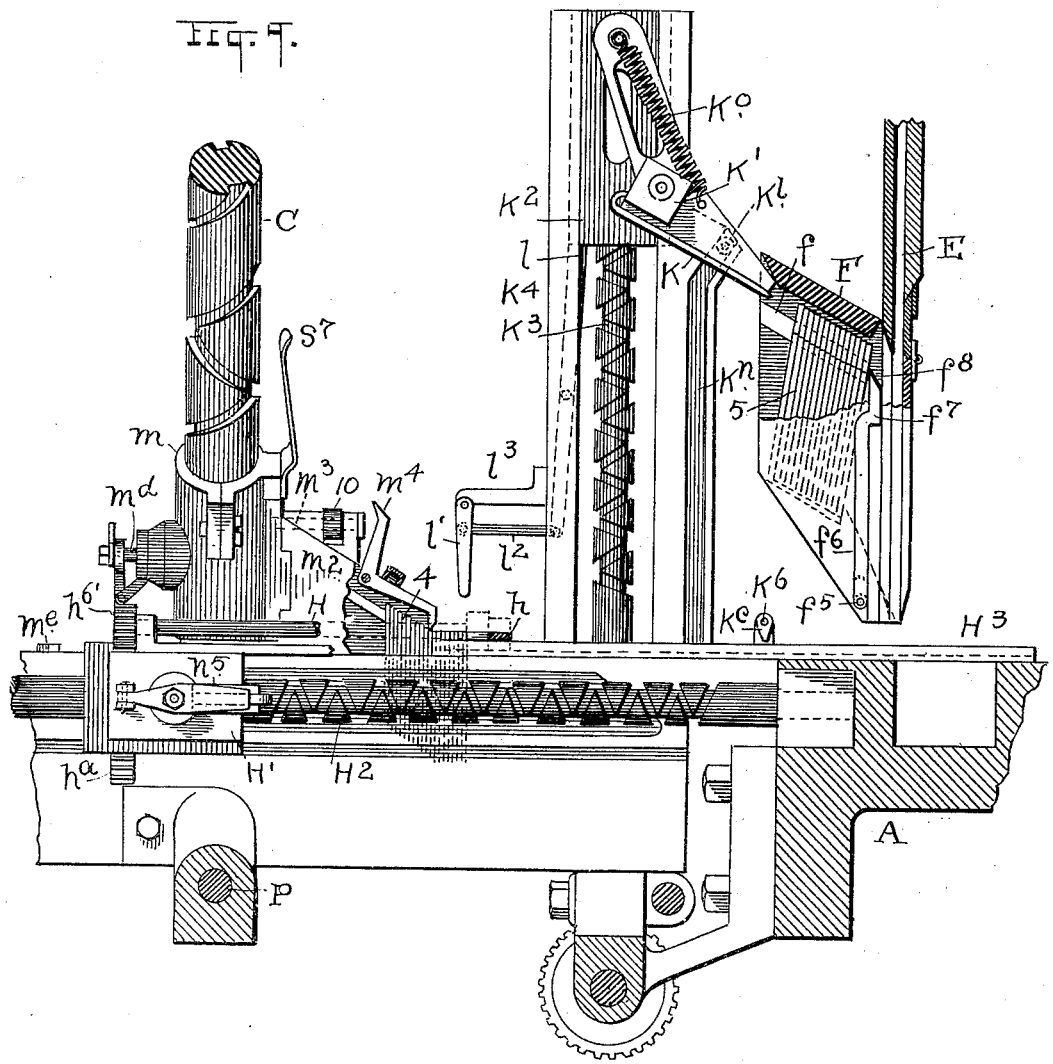
Figure 10:
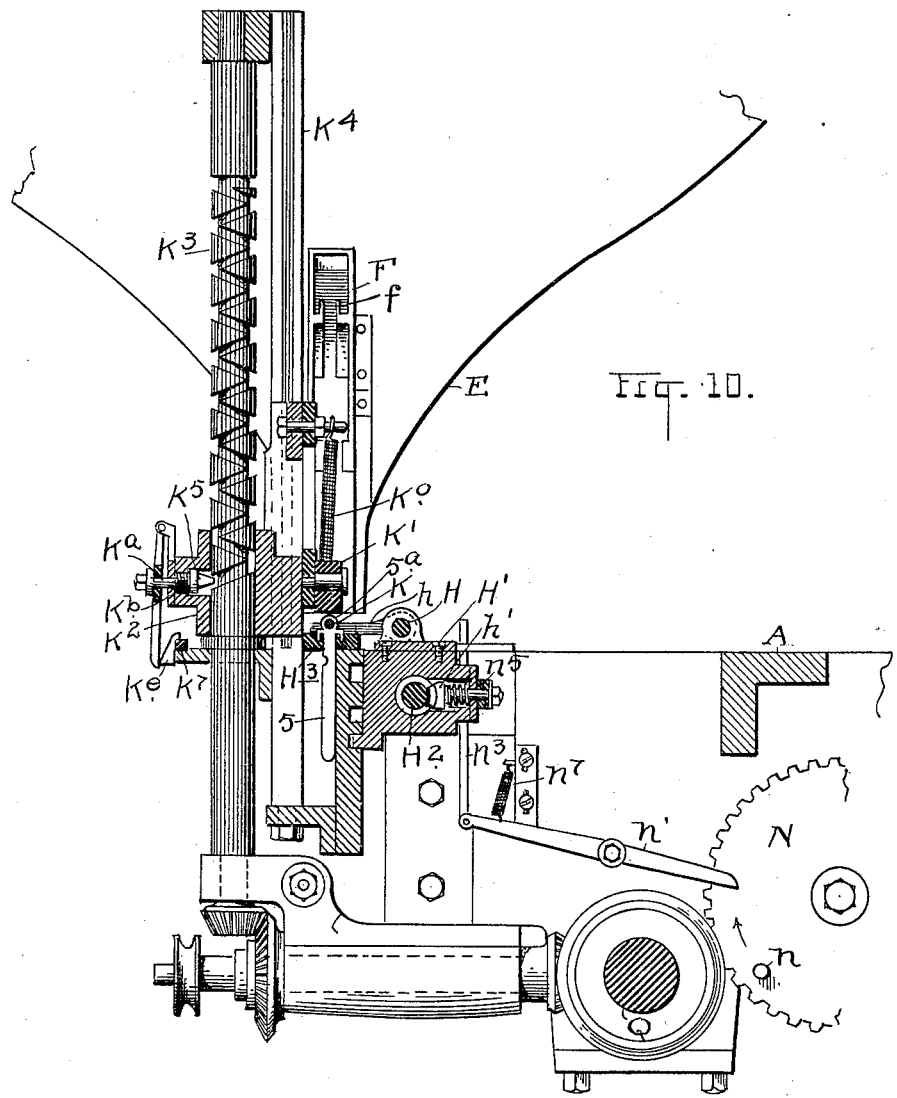
Figure 15:
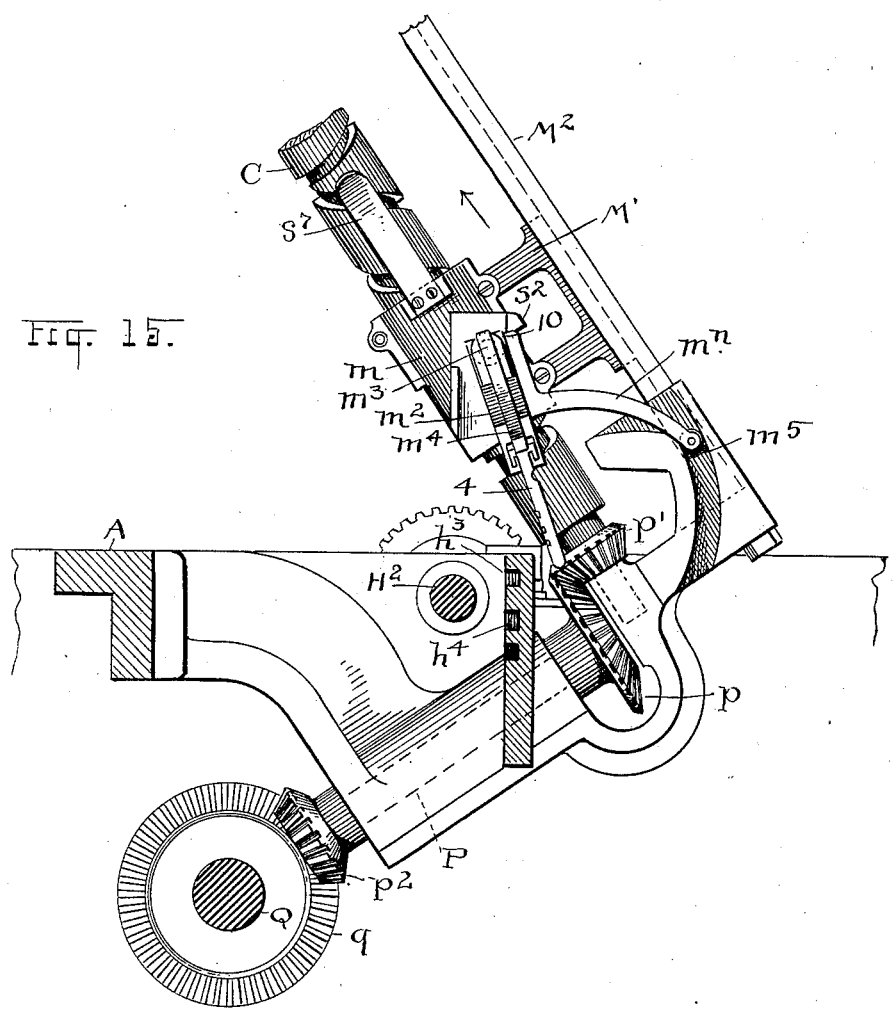

In the accompanying drawings, Figure 1 is a front elevation of the complete machine in readiness for operation. Fig. 2 is a side elevation of the machine looking in from the left toward the right in Fig. 1. Fig. 3 is a rear elevation of the machine of which the front is seen in Fig. 1. Fig. 4 is a plan view of the base and the operating parts therein and beneath and with the top part of the machine removed and corresponding substantially to a view looking down from line 4 4, Fig. 1. Fig. 5 is a cross-section of the machine with some of the parts broken away and taken on line 6 6, Fig. 4. Fig. 6 is a sectional elevation on line 5 5, Fig. 8. Fig. 7 is a cross-section of the machine corresponding to line 7 7, Fig. 4. Fig. 8 is a plan view on a line corresponding to 8 8, Fig. 6. Fig. 9 is a sectional elevation on line 5 5, Fig. 8, and corresponding to Fig. 6, but enlarged and showing matrices as they are pushed into the elevator ready to be distributed. Fig. 10 is a sectional elevation of a part of the machine taken on line 10 10, Fig. 8, and looking toward the front. Fig. 11 is a sectional elevation on line 11 11, Fig. 8, designed to show a part of the mechanism for carrying the matrices back toward the distributing mechanism. Fig. 12 is a cross-section on line 12 12, Fig. 11. Fig. 13 is a view of the mechanism shown in Fig. 11 and corresponding to said figure in the main, but showing also the carrier mechanism for distributing the line of matrices in a returned position. Fig. 14 is a cross-section on line 14 14, Fig. 13, resembling Fig. 12 in certain details, as will hereinafter appear. Fig. 15 is a sectional elevation of the machine on line 15 15, Fig. 5, looking toward the rear and shows the elevator ascending. Fig. 16 is a front elevation of the mechanism at the top of the screw for transferring the line of matrices to the distributing box or magazine. Fig. 17 is a cross-section of the mechanism in Fig. 16 on line 17 17. Fig. 18 is a side elevation of the upper part of the machine shown in Fig. 16. Fig. 19 is an enlarged view of the transfer-box and distributing-box with associated mechanism shown in Fig. 18. Fig. 20 is a cross-section of the bottom of the transfer-box on line 20 20, Fig. 19. Fig. 21 is a sectional elevation of a part of the mechanism as shown in Fig. 16 and taken on line 21 21 thereof and enlarged. Fig. 22 is a cross-section on line 22 22, Fig. 21, showing the releasing mechanism for the line of matrices. Fig. 23 is a perspective elevation of a matrix as used in this machine. Fig. 24 is a perspective elevation of a spacer. Fig. 25 is a perspective elevation of the spacer bank or magazine at the rear and bottom of the assembling-plate and the key mechanism to operate the same. Fig. 26 is a perspective elevation of the spacer-magazine-releasing mechanism looking more particularly from the front. Fig. 27 is a sectional elevation of the assembling-plate and one of the magazines and the mechanism for releasing the matrices in the magazine to drop into the said plate, the plate and mechanism being broken at the center to accommodate it to the drawings.

In cotemporaneous applications I have one application, Serial No. 718,085, which has to do more especially with the mechanism in the base of the machine for the distribution of power here and there for the various operations and functions of the machine. Another application, Serial No. 693,230, covers more particularly what is known as the "distributing" mechanism, taking the matrix from its companions in a line and sending it to its proper magazine, and a third application, Serial No. 727,151, covers particularly the means for supplying the blanks which form the type-bar to the impression-chamber. This application therefore relates to the remaining part of the machine not especially disclosed or covered in the foregoing applications and in the main having reference to the assembling of the matrices in the composition-box and the carrying away of the same to the distributing mechanism proper. To this end, however, it has been deemed necessary to bring into view all or chiefly all of the operating parts of the machine, even though certain of said parts are not claimed herein, but belong to the subject-matter of the other named applications, and this has been necessary because the invention is so interwoven in its structure and functions that more distinct lines of separation have not been practicable.

Having reference now again to the drawings, A represents the base or body of the machine, which is preferably produced in a single casting of such weight and strength altogether as to make a firm substantial structure throughout.

B and B represent two columns secured at their base upon the frame A and having an elbow $b$ extending at right angles to the front, as seen in Fig. 2, and a projection $b'$ standing up directly from the angle of said elbow to support parts higher up, while a long arm $b^2$, and likewise integral with B, runs to the highest point of the mechanism, as also seen in Fig. 2, to support the upper end of the elevator screw or shaft C and other parts, as will hereinafter appear.

D is a keyboard, which is designed to be used as keyboards ordinarily are for the assembling of the matrices, and the connections of which to the respective banks in which the matrices are held will be hereinafter traced out and explained.

E is the so-called "assembling-plate," which we will assume is shown in open and full elevation in Fig. 1, and it would appear as thus shown even if the usual glass cover or door were swung down over it, whereby the front of the plate is covered, and the matrices are confined to their channels of travel the same as they would be if an ordinary plate cover were used. Glass is employed because it is deemed better and enables the operator to witness the assembling of the matrices and to take note of any possible though not at all probable obstruction that might occur in the various channels. There is one channel for each magazine of matrices. These channels are separated laterally by walls 2, the most of which are more or less curved, as shown, but all are designed to be of such arrangement relatively to the point to which the matrix has to travel to enter the composing-chamber that they will all reach the point of destination in about the same time and all with such promptitude that they are no sooner released than they may be said to have taken their place in line. At any rate and necessarily the time occupied in making the distance is only momentarily, and those at the sides by reason of the peculiar construction of the plate and its channel reach the composing-chamber as quickly as those directly at the top and center.

Referring now to Fig. 27, we see in sectional elevation one of the many magazines G for the matrices with a number of matrices 4 therein, and a front elevation of a series of magazines is shown in Fig. 16. Just as many of these magazines as may be needed can be added, and some ninety are employed in the present machine, though not so many shown.

The matrices have T-shaped heads and there are flanges or ribs $g$ on which the heads rest at each side, and as all these magazines and the operating mechanism for the matrices therein are alike a description of one will suffice for all. Thus in Fig. 27 we see both the detaining and the releasing mechanism. Here are a series of matrices suspended alike from the inclined ribs or rests $g$ and ready to slide off the instant they are liberated. According to my construction, however, only one can get away at a time and this one the lowest in the magazine. To this end there is on both sides a very slight but sufficient detention plate or projection $g'$, engaging the head of the lower matrix to keep them all back at the top, while at the bottom there is a somewhat corresponding stop $g^2$, and the two taken together place the matrices in an inclined position to a vertical plane. The front upper corners of the stop $g'$ against which the matrices rest in magazine are cut away to facilitate the drop into the assembling channels or ways, having the walls 2 separating them. There is also at the top of the magazines a peculiar part $g^3$, constructed to allow the heads of the matrices to slide freely thereunder, but not to be lifted until they each in succession pass the outer edge thereof, where there is room for only one matrix between said part and the detaining-lugs $g'$. Now as any one of the key-levers $b^a$ is depressed the releasing-dog $b^c$ above lifts only the lower matrix sufficiently to pass both stops $g'$ and $g'$, and instantly its lower end strikes the inclined back of stop $g^2$ and glances out into its channel and thence to the composing-chamber below. A line of mechanism connects key-lever $b^a$ and dog $b^c$, which may be of one form or another, as may seem desirable, but should be such as to afford easy and prompt actuation of the dog. As here shown, it comprises the series of parts consisting of the pivoted lever $b^d$, the link $b^3$, working in two fixed bearings, bar $b^4$, connecting lever $b^d$ and said link, the rocking arm $b^5$, the link $b^6$, and the matrix-lifting rod $b^7$, working in a fixed guide $b^8$. All said parts connected together, as shown in Fig. 27. An adjustable spring $b^9$ assists in the prompt return of all these parts to their normal position, so that as one matrix is liberated from a magazine the others will simply move down the width of one, but rest until another is called out.

In the composing of a line there necessarily is need of spaces to justify the line, and these have a central magazine F alone centrally or at the middle of and below the column of magazines, with a direct feed down through a slot in the back of plate E. A front to rear sectional elevation of this particular magazine is shown in Fig. 8, in which there is also shown a line of composition being carried bodily away from the composing-chamber and the spaces 5 being picked out, as will hereinafter appear. The form of the space or spacer here shown is the subject-matter of a cotemporaneous application of mine, Serial No. 601,051, and is not claimed here. It has a T-shaped head like the matrices and tracks F, on which the spaces rest in magazine. Stops $f'$ at the top and $f^2$ at the bottom detain the spaces in magazine, and they are released one at a time by a line of mechanism proceeding from the spacer or justifying key or bar $f^3$. This carries a short link $f^4$ at its rear connected with a cross-rod $f^5$, on which are two lift-bars $f^6$, one on each side of magazine F and carrying each at its top a block $f^7$, on the inner side of which is a thin plate-like projection $f^8$, with its upper end cut to a sharp bevel and point to engage in the recesses of the spacer-head and lift and discharge one at a time. As soon as the spacer-arms strike the sharp inclination $f'$ they glance away and are off to the composing-chamber, being of course swung clear from stop $f^2$ at the bottom at the same time. Here again the mechanism intervening the immediate lift for the spacer and the key-bar $f^3$ may be changed and varied as may seem best without departing from the spirit or scope of the invention.

Passing over the matrices and spaces in line in the composing-chamber and the mechanism having to do with making a bar therefrom, which is the subject of one of the above-mentioned applications, and assuming that the line is in transit for distribution, we find the same being advanced as appears first in Figs. 6 and 8, where the line is engaged by arm $h$ on shaft H and the traveling carrier H′ with a feather $h'$ on shaft H², so that the carrier will travel both back and forth on the reversely and double threaded shaft H². The arm $h$ is down to the track H³, behind the line of matrices, as in Fig. 8, and carries them along the full distance of said track and to the point where they are elevated for distribution, and on its return it is turned upright, Fig. 13, to pass clear of everything and be restored to position to enter again behind another line in the composing-chamber and bear it away, as before. Meantime, however, the spaces 5 have to be assorted out of the line and restored to their own magazine, and the means for doing this is seen in Figs. 6, 8, and 10 mainly. First in these means is the threading needle or wire $k$ on the pivoted arm $k'$ on box or block $k^2$, which travels back and forth on upright double-threaded shaft $k^3$. The spaces have eyes $5^a$ in their top above the T-head, into which the pointed collecting-needle $k$ enters, and the mechanism is so timed that when the spaces are thus threaded, as in Figs. 11 and 12, the parts $k$, $k'$, and $k^2$ will rise together, and the spaces will be withdrawn by the time the farther end of the needle is reached and ascend into position to discharge them into the magazine F above. The box or block $k^2$ travels in guide-ways $k^4$, Fig. 8, and a feather $k^5$ makes alternating engagement of the box with the two reverse threads on shaft $k^3$. Normally the feather is in engagement and has a stem $k^a$, on the inner portion of which is a spring $k^b$ to keep the feather at work, and it is only withdrawn when the box K² is down waiting for its load. The feather reverses automatically both at the top and bottom of the screw-shaft. This withdrawal of the feather is brought about by means of the line-carrying arm $h$ engaging a short arm $k^c$ on rock-shaft $k^6$, Fig. 8, having an arm $k^d$ at its other end, Fig. 7, connected with a sliding bar $k^7$ and having an inclined lug or portion $k^e$. A pivoted lever engaged between its ends on the outer extremity of feather-shaft $k^a$ is adapted to strike the incline $k^e$ when the block or head $k^2$ and its needle descend and throw the feather out, so that shaft $k^3$ may continue to rotate, but the said parts will rest until they are loaded and then return for unloading above. Normally the bar and its incline $k^e$ are withdrawn from working position by spring $k^g$ on shaft $k^6$. Now following the lifting or carrier mechanism for the spacers 5 up to the discharge-point into magazine F we see the same in discharging relation in Fig. 9, with associated views in Figs. 5 and 6. In Fig. 9 the discharge has just occurred and the parts are in the position of the discharging movement. Here we see the arm $k'$ and needle $k$ tilted to the same inclination substantially as the receiving guides or plates $f$ and $f$, Fig. 26, above described, and this position is caused by a roller $k'$, running in a channel $k^n$ and which turns outward at its top. The end of its travel has been reached in Fig. 9, so that the parts are now ready to start back to their lower position, and as the straight lower portion of the channel $k^n$ is reached the retracting-spring $k^o$ raises arm $k'$ to horizontal position as before. All the spacers are thus discharged into their magazine, from which they are called by mechanism shown most clearly in Figs. 25 and 26. Momentarily, however, the said parts are detained in their descent by contact with the pivoted pawl or stop $l$, Fig. 9, which is released by the short rack $h^n$ striking the pivoted arm $l'$ and tilting the pawl $l$ out of the way through the connecting-link $l^2$, a post $l^3$ serving as a pivot-point above said link for the lever-arm $l'$. In its back-and-forth travel it is necessary that the rod H, supporting arm $h$, should be rotated to bring arm $h$ to a substantially-vertical position to carry it past the composing-box. This is done by means of the rack $h^a$, supported in one end of the carrier-frame H' and having a roller $h^b$ on its side traveling in a pair of parallel tracks $h^3$ and $h^4$, Figs. 11 to 14, Sheet 11. An inclined drop at each end to the upper track to the lower track is bridged by a pivoted spring-pressed deflector $h^5$ and $h^6$, one of which is normally up and the other normally down, as seen in both Figs. 11 and 13. The direction of travel in these tracks is always to the right in the upper one and to the left in the lower one, so that when the roller $h^2$ goes to the end of channel $h^3$ it will descend and ride over and beneath deflector $h^5$. Then having reached the end of its travel to the right by reason of the stop of carriage H' it travels to the left in track $h^4$ until it passes through beneath deflector $h^6$. As this occurs the said deflector drops immediately down again, and on its return the said roller ascends it into the track $h^3$, and so on around and around. The up-and-down movement of rack $h^a$ occurring through roller $h^2$ rotates the shaft H by or through pinion $h^{6'}$ on said shaft engaged by said rack, and the difference in the two positions of arm $h$ is determined by the degree of rotation thus imparted. Now going back to the lever $l'$, through which the pawl $l$ is controlled for stopping temporarily the space-carrier $k^2$, it will be seen in Fig. 13 how the said lever is actuated on the return of carriage H' and through the rack $h^a$ carried thereby. Referring also again to feather $h'$, Figs. 5, 8, and 10, the means to withdraw the same as the carriage H' reaches its movement to the right awaiting the work of making a type-bar and liberating a line of type, we find a line of mechanism proceeding from gear-wheel N, which does not travel continuously, but as it is called into action by the operator. A pin or lug $n$ on this wheel strikes a pivoted lever $n'$, which in turn actuates a bent bar $n^3$, Fig. 5, on which is an inclined projection $n^4$. A lever $n^5$, connected with feather $h'$ and pivoted at one end, is adapted at its free end to engage the inclined lug $n^4$ as it travels to the right, and thus withdraw the feather from screw-shaft $H^2$. This remains until gear-wheel N rotates to liberate lever $n'$, when the retracting-spring $n^7$ throws the lug $n^4$ upward away from the lever $n^5$ and the feather is at once thrown into engagement again by its spring. Having eliminated the justifying-spaces from the line of matrices, the said line goes forward to the elevator, which delivers it to the distributing mechanism, and the elevations showing the next step are seen chiefly in Figs. 5, 6, and 9. The double reversely-threaded shaft C, which carries the matrix-elevator $m$, is set at an inclination at the rear of the machine, as seen most clearly in Fig. 3, which is a rear elevation of the machine, and is supported at its upper end by the arm or trunk $b^2$ of the post B. The elevator $m$ is adapted to traverse shaft C back and forth and has a feather $m'$, Fig. 6, engaging it therewith, but which is disengaged at times, as hereinafter described. At the front of the elevator is a carrier $m^2$, pivoted to rotate on bolt $m^3$ on the elevator and provided with a pivoted spring-pressed matrix holder or retainer $m^4$, constructed to permit the matrices to be pushed in beneath it and to retain them when thus delivered on the carrier $m^2$, Fig. 9. When all the matrices are thus delivered, the carriage H' is supposed to have completed its trip and is ready to return, and the elevator $m$ also is ready to ascend with its head. Meantime the feather $m'$ has been held out of engagement with its shaft or screw C and must be released. As shown in Figs. 6 and 8, it is out of engagement by reason of the lever $m^a$, pivoted between its ends on arm $m^b$, rigid with elevator $m$, bearing against the inclined end or face of bell-crank lever $m^c$ at one end and at the other connected with the spindle $m^d$ of feather $m'$. Now to liberate the feather and let it go to work the carriage H' strikes the arm $m^e$ of a sliding bar $m^g$, which is connected by a link with the lever $m^c$, Figs. 6 and 8, and the inclined and detaining portion of the bell-crank lever is swung in at once by its spring $m^h$ and the elevator ascends with its load. The screw-shaft C has its power connections at its lower end and is in constant rotation through suitable gear-and-shaft connection with the power-shaft. The elevator $m$ being started, the carrier $m^2$ has to be rotated to avoid obstructions in its initial movements, and for this purpose I provide a curved arm $m^n$, Fig. 15, having a roller on its end to run in a curved groove $m^5$, and the obstructions being passed the carrier hangs freely on the side of the elevator as it travels to the top of the screw to be discharged, the matrices being suspended therein by their heads, as shown. In this travel up and down the elevator is directed by a guiding portion M', running in the fixed guideways $M^2$, so that it must pursue a straight line in both directions and land at both ends at predetermined places. A short shaft P is shown, on which is a gear $p$, meshing with a gear $p'$ on shaft C, and at the opposite end the shaft P has a gear $p^2$, meshing with another gear $q$ on power-shaft Q. All the foregoing gears are bevel or miter gears. Having reached the end of its upward travel, the elevator C strikes a spring-pressed stop or bolt $s$ and the elevator is brought to a stop, but only for a few moments, and in this time it discharges its matrices into the transfer-box T, the actual relation of the parts as this goes on being seen in Fig. 18. Meantime also a dog $s'$ has gravitated in and engaged a catch $s^2$ on the elevator, Fig. 16, and the elevator is detained only long enough for the pin $s^3$ on arms $s^4$ to run down and out of the quick-thread $s^5$ on the upper end of shaft C, and this takes but a moment. The arms $s^4$ then strike the shoulder $s^6$ on the dog $s'$ and release the same, when the elevator is free to return. An arm $s^7$ on the elevator presses the pin $s^3$ into engagement, and a spring $s^8$ lifts the arm $s^4$ up when released. In Fig. 16 the transfer-box T is shown in front elevation and conceals the matrix-carrier at its rear; but a side elevation is seen in Fig. 18. As soon as a transfer has been made the mere weight of the matrices is sufficient to tilt the box T into the position seen in dotted lines, Fig. 18, and this done the matrices pass next to the magazine for the distributing mechanism proper, which is the subject-matter of application Serial No. 93,230, and hence need not be specifically shown nor described here, the ultimate destination of all the matrices being their several magazines. Now in order to release the matrices from the detainer $m^4$ in the carrier $m^2$ the detainer is slightly but sufficiently tilted by the arms $s^9$. A spring $s^{10}$ presses the dog $s'$ to engaging position. To tilt the transfer-box T up into receiving position, as in Fig. 18, a series of parts are used having their starting-point in the lever $2^s$, Fig. 16, and showing it in full lines, as occurs when the box is up, as in Fig. 18, and in dotted lines, as occurs when the box is down, as in Fig. 19. The lever $2^s$ has a gear $3^s$, meshing with rack $4^s$, provided with an offset extension working in a keeper $5^s$, connected at its lower end by link $6^s$ with an arm $t$, rigid with the transfer-box T. The box T is pivoted at $t'$. Returning to Fig. 16, a roller 10 is shown in dotted lines on the matrix-carrier engaging the lever $2^s$, also in dotted lines, and higher up in the same figure both said parts are shown in full lines, in which relation the transfer-box is in raised position to receive the load of matrices just now arrived. In this movement the lever $2^s$ operates through rack $4^s$ to raise the box. The curved arm $m^n$ on the matrix-carrier has also come into service again to aline the carrier with the transfer-box, if this be necessary, by riding over the guide 12. On the reverse movement of the transfer-box to its seat the mechanism for liberating the matrices therefrom is brought into action. This mechanism is seen on Sheets 14, 15, and 16, and cross-sections of the box are seen in Figs. 20 and 22 at right angles to each other. In the box at the head is an L-shaped rest 13, Fig. 20, and at the front or point two catches 14, Fig. 22. Until the box has tilted both sets of stops are closed, and when tilted both are mechanically opened. To do this, there is a T-shaped lever 15, pivoted on the side of the box and having one arm engaged with a wedge 16, working in a keeper and engaging between the side of the box T and a right-angled arm 17 on the stop or rest 14. Corresponding mechanism with the same reference-letters is seen on the other side of the box, Fig. 19. A rock-bar with opposite arms 17' and 18 is fixed on the box T above its pivot, and arm 17' works in a long slot in the pivoted check 20, while the arm 18 connects with link 21, reaching to the bottom of lever 15. On the near side only of the box T, Fig. 21, there is mechanism to raise and lower the L-shaped stop or rest 13 for the heads of the matrices, consisting of pivoted lever 22, having a part 23 with an inclined surface which the inner arm of the lever 15 contacts to raise the lever 22 at certain times, and thus through link 24 raise part 13. A spring 25 keeps lever 22 normally down, and the turning of lever 15 is timed with the seating of box T on the magazine W and for the simultaneous release of the matrices at both ends. Of course both end mechanisms are always closed until the box is turned down for discharge, and the length of the slot in the check 20 is such as to cause the said mechanism to assume both positions at the right times. The L-shaped piece 13 moves rearward to open the way and forward to close it and is shown as open in Fig. 20, while the catches 14 work laterally and are closed in Fig. 22. Springs 26 press the catches inward.

What I claim is—

1. As a new article of manufacture, a spacer having a T-shaped head and a projection above its T-head adapted to be engaged by a carrying mechanism, substantially as described.

2. In a type-bar machine, a spacer with an eye in its head, in combination with a spacer-carrier having a needle fixed thereto at one end and mechanism for threading the spacers onto the needle, substantially as described.

3. In a type-bar machine, a spacer with an eye in its upper end to be engaged by a needle, a carrier and a needle fixed thereto at one end to engage the spacer and lift it out of a line of matrices and carry it away for distribution, and means to tilt the carrier, substantially as described.

4. In a machine substantially as described, a carrier and a needle to gather up the spacers fixed thereon, a screw-shaft, and an elevator to which the carrier is attached riding on said shaft, substantially as described.

5. The spacer-elevator and the threaded shaft therefor, a carrier pivoted on said elevator, a needle on the carrier to take up the spacers and spacers having eyes to be threaded, substantially as described.

6. The elevator-shaft and the elevator thereon, in combination with a carrier pivoted on the elevator and a needle rigid with the carrier to engage and convey the spacers, substantially as described.

7. The elevator screw-shaft and the elevator thereon, a carrier on the elevator and a needle to lift the spacers fixed to said carrier, in combination with a magazine to receive the spacers and means to discharge them from said needle into the magazine, substantially as described.

8. A magazine to receive the spacers having means along its top and sides to engage the heads thereof, in combination with spacers having substantially T-shaped heads projecting laterally beyond the edges of the spacer, an elevator and a carrier, and means on the carrier to engage the upper ends of the spacers and deliver them to said magazine, substantially as described.

9. A magazine to receive the spacers having means along both sides of its top to engage the heads thereof, in combination with spacers having substantially T-shaped heads projecting laterally beyond the edge of the spacer, an elevator and a carrier thereon, and means on the carrier to engage the upper ends of the spacers and deliver them to said magazine, substantially as described.

10. A magazine for the spacers and the spacers having their heads constructed to be engaged at both sides for carrying them in the magazine, in combination with elevator and carrier mechanism for said spacers, means on the carrier to engage the heads of the spacers, and means to tilt the carrier, substantially as described.

11. The means substantially as described for separating the spacers from a line of matrices consisting in a track supporting said line, means to move the line along on the track and means to engage the upper ends of the spacers and withdraw them from the line, said means comprising a carrier and a needle secured to the carrier adapted to thread into the spacers, substantially as described.

12. The machine having a track for a line of matrices and spacers, and the spacers projecting above the matrices and constructed to be engaged for withdrawal, in combination with means to convey the line forward on said track, and lift mechanism to take the spacers out of the line while it is in movement, said mechanism comprising a carrier and a needle to thread the spacers on, substantially as described.

13. The track, the line of matrices and spacers thereon, and means to slide the line on the track, the said spacers projecting above the matrices and constructed to be engaged at their top, in combination with lift mechanism in line with said upper ends of the matrices and constructed to engage and carry the same, whereby the spacers are picked out of the line while the matrices are traveling along to their destination, substantially as described.

14. The means to take a line of assembled matrices and spacers from the composing-chamber for distribution, comprising a track from which said line is suspended and a device to push the line along on the track, in combination with lift and conveying mechanism for the spacers between the ends of the track, and elevator mechanism at the end of the track to receive the matrices, substantially as described.

15. The line-carrying track having two parallel sides, in combination with a line of matrices and spacers having substantially T-shaped heads resting on said track and the spacers having projections above their T-heads to be engaged by lift mechanism, in combination with said lift mechanism constructed to withdraw the spacers bodily, and means to receive the matrices at the end of said track and to distribute the same, substantially as described.

16. In a type-bar machine, a set of line-carrying tracks, in combination with means to move a line of matrices along on said track consisting of a carriage, a rotatable shaft thereon, and an arm on the shaft to engage the line, and means to rotate said shaft at predetermined points, substantially as described.

17. A type-bar machine having tracks for carrying a line of matrices, a carriage and a reversely-threaded shaft on which it travels, and means on the carriage to engage said line of matrices, substantially as described.

18. A combined elevator and carrier constructed to carry a line of T-headed matrices, in combination with a reversely-threaded screw to carry the same, and a feather in the elevator to change the direction of travel, substantially as described.

19. The reversely-threaded screw, the elevator thereon having a feather adapted to change the direction of travel, and the carrier pivoted on said elevator and constructed to convey a series of matrices in a suspended position, substantially as described.

20. In a matrix-machine, a matrix-elevator, and a reversely-threaded screw to carry the same, in combination with a receiving-box into which the matrices are delivered from the elevator, substantially as described.

21. The matrix-elevator and a reversely-threaded screw on which it travels, in combination with a pivoted transfer-box to receive the matrices from the said elevator constructed to liberate the matrices by gravity, substantially as described.

22. The matrix-elevator comprising a reversely-threaded screw and a matrix-carrier thereon, and the magazine from which the matrices are distributed one at a time through the bottom, in combination with an intermediate tilting transferring device, substantially as described.

23. The matrix-elevator, a reversely-threaded screw carrying the same, and the magazine to receive the matrices, in combination with a tilting matrix-transferring device between said parts and means to automatically reverse the position of the said transferring device, substantially as described.

24. The matrix-distributing magazine, a transferring-box to drop the matrices therein together, and mechanism to liberate the matrices one at a time flatwise from the bottom of said box, substantially as described.

25. The line-tracks, the carriage and a rotatable shaft and arm thereon, a pinion on the shaft, a rack engaging the pinion and means to operate the rack as the carriage reaches the ends of its travel, substantially as described.

26. The line-tracks, the carriage and the shaft thereon having an arm at one end and a pinion at the other, a rack to operate said pinion, a roller on the rack and parallel channels for said roller on different planes and deflectors for the roller from one channel to the other, substantially as described.

27. The means for elevating a line of matrices for distribution consisting of an elevator-screw, an elevator thereon, a matrix-carrier pivotally supported on said elevator and constructed to carry the matrices in suspended position, substantially as described.

28. The line-carrying tracks constructed to support matrices with T-shaped heads, and means to move the line along on said tracks, in combination with an elevator-screw and elevator thereon, and a matrix-carrier on said elevator, substantially as described.

29. The magazine from which the matrices are distributed in combination with a tilting transferring-box, and movable means in the bottom of said box constructed to liberate the matrices when the box is turned to discharge into the magazine, substantially as described.

30. The reversely-threaded elevator-screw and the matrix-elevator thereon, and the tilting transferring-box having each inclined tracks along their top to receive T-headed matrices, means to liberate the matrices into said box, and means to reverse the elevator on said shaft, substantially as described.

31. In a type-bar machine, a matrix-elevator and a reversely-threaded shaft to raise and lower the elevator, and means at the top of the shaft to momentarily detain the elevator before it descends, thereby giving time for the discharge of the matrices, substantially as described.

32. In a type-bar machine, a matrix-elevator and a reversely-threaded shaft on which it travels up and down, a stop to hold the elevator at the end of its upward trip, and means connected with said shaft to release said stop and allow the elevator to descend, substantially as described.

33. The reversely-threaded shaft and the matrix-elevator thereon, a temporary detaining mechanism for the elevator at the end of its upward travel, and the said shaft having a separate thread engaged by said detaining mechanism, thereby fixing the limit of detention, substantially as described.

Witness my hand to the foregoing specification this 8th day of February, 1899.

ROSWELL H. ST. JOHN.

Witnesses:
H. T. FISHER,
R. B. MOSER.